United States Patent
Kodemura et al.

(10) Patent No.: US 11,884,761 B2
(45) Date of Patent: Jan. 30, 2024

(54) LATEX COMPOSITION

(71) Applicant: ZEON CORPORATION, Tokyo (JP)

(72) Inventors: Junji Kodemura, Tokyo (JP); Misa Hayashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 146 days.

(21) Appl. No.: 16/639,259

(22) PCT Filed: Aug. 22, 2018

(86) PCT No.: PCT/JP2018/031045
§ 371 (c)(1),
(2) Date: Feb. 14, 2020

(87) PCT Pub. No.: WO2019/039523
PCT Pub. Date: Feb. 28, 2019

(65) Prior Publication Data
US 2020/0247931 A1    Aug. 6, 2020

(30) Foreign Application Priority Data
Aug. 25, 2017   (JP) ................. 2017-162384

(51) Int. Cl.
| | | |
|---|---|---|
| *C08K 5/38* | (2006.01) | |
| *C08L 15/00* | (2006.01) | |
| *C08F 279/02* | (2006.01) | |
| *C09J 147/00* | (2006.01) | |
| *C08K 3/105* | (2018.01) | |
| *C08K 3/26* | (2006.01) | |
| *C08K 3/30* | (2006.01) | |

(52) U.S. Cl.
CPC .............. *C08F 279/02* (2013.01); *C08K 5/38* (2013.01); *C08L 15/00* (2013.01); *C09J 147/00* (2013.01); *C08K 3/105* (2018.01); *C08K 3/26* (2013.01); *C08K 3/30* (2013.01); *C08K 2003/309* (2013.01)

(58) Field of Classification Search
CPC .................. C08K 5/38; C08L 15/00
See application file for complete search history.

(56) References Cited

U.S. PATENT DOCUMENTS

| | | | |
|---|---|---|---|
| 3,988,275 A * | 10/1976 | Satake | C08K 5/521 |
| | | | 524/145 |
| 4,036,804 A | 7/1977 | Hirai et al. | |
| 4,206,007 A * | 6/1980 | Force | D06N 3/16 |
| | | | 156/334 |
| 5,444,118 A * | 8/1995 | Tsuruoka | C08F 236/04 |
| | | | 524/828 |
| 6,031,042 A | 2/2000 | Lipinski | |
| 2009/0199945 A1 * | 8/2009 | Galimberti | C08K 3/346 |
| | | | 524/426 |
| 2012/0021155 A1 | 1/2012 | Chen et al. | |
| 2015/0128329 A1 | 5/2015 | Amarasekera et al. | |
| 2015/0210880 A1 | 7/2015 | Chen et al. | |
| 2015/0272245 A1 | 10/2015 | Khor et al. | |
| 2015/0376322 A1 | 12/2015 | Nakamura et al. | |
| 2016/0137868 A1 | 5/2016 | Chen et al. | |
| 2017/0145185 A1 | 5/2017 | Chen et al. | |
| 2017/0298210 A1 | 10/2017 | Joe et al. | |

FOREIGN PATENT DOCUMENTS

| | | | | |
|---|---|---|---|---|
| CN | 104419042 A | * | 3/2015 | ........... A41D 19/015 |
| GB | 685709 A | * | 3/1950 | ............... C08K 5/39 |
| JP | H10-158980 A | | 6/1998 | |
| JP | 2000-512684 A | | 9/2000 | |
| JP | 2006-045530 A | | 2/2006 | |
| JP | 2013-534555 A | | 9/2013 | |
| WO | 2014/129547 A1 | | 8/2014 | |
| WO | 2016/105112 A1 | | 6/2016 | |

OTHER PUBLICATIONS

Feb. 25, 2020 International Preliminary Report on Patentability issued in International Patent Application No. PCT/JP2018/031045.
Oct. 23, 2018 International Search Report issued in International Patent Application No. PCT/JP2018/031045.
May 3, 2021 Extended European Search Report issued in European Patent Application No. 18849288.8.

* cited by examiner

*Primary Examiner* — Vickey Nerangis
(74) *Attorney, Agent, or Firm* — Oliff PLC

(57) ABSTRACT

A latex composition containing a carboxy-modified polymer latex, a xanthogen compound, and a typical metal compound in a form other than an oxide. This latex composition has excellent stability, can avoid delayed (Type IV) allergic reactions in addition to immediate (Type I) allergic reactions, and can provide a molded film, such as a dip-molded product, having excellent tear strength and tensile strength. Also a molded film and a substrate with an adhesive layer which are obtained using the latex composition.

9 Claims, No Drawings

LATEX COMPOSITION

TECHNICAL FIELD

The present invention relates to a latex composition, and more specifically to a latex composition that has excellent stability, can avoid delayed (Type IV) allergic reactions in addition to immediate (Type I) allergic reactions, and can provide a molded film, such as a dip-molded product, having excellent tear strength and tensile strength. The present invention also relates to a molded film and a substrate with an adhesive layer which are obtained using the latex composition.

BACKGROUND ART

Conventionally, it has been known that molded films, such as dip-molded products (e.g., nipples, balloons, gloves, balloons, and stalls), used in contact with human bodies can be obtained by dip-molding a latex composition containing natural rubber latex. However, in some cases, such dip-molded products are not suitable for use in direct contact with the mucosa or organs of living bodies because the natural rubber latex contains proteins that may cause immediate (Type I) allergic reactions in human bodies. In response to this problem, the removal of proteins in natural rubber latex by purification or the like and the use of a synthetic rubber latex instead of natural rubber latex have been studied.

For example, Patent Document 1 discloses a composition for dip-molding that is a latex composition containing zinc oxide, sulfur, and a vulcanization accelerator mixed with a latex of synthetic polyisoprene as a synthetic rubber. Unfortunately, although the technique of Patent Document 1 can avoid the immediate (Type I) allergic reactions to proteins derived from natural rubber, dip-molded products obtained by this technique, when brought in contact with human bodies, may sometimes cause delayed (Type IV) allergic reactions due to dithiocarbamate vulcanization accelerators and thiazole vulcanization accelerators contained in the dip-molded products.

RELATED ART DOCUMENTS

Patent Documents

Patent Document 1: International Publication No. WO 2014/129547

SUMMARY OF THE INVENTION

Problem to be Solved by the Invention

The present invention has been devised in response to the current issues, and an object thereof is to provide a latex composition that has excellent stability, can avoid delayed (Type IV) allergic reactions in addition to immediate (Type I) allergic reactions, and can provide a molded film, such as a dip-molded product, having excellent tear strength and tensile strength, and a molded film and a substrate with an adhesive layer which are obtained using the latex composition.

Means for Solving the Problem

As a result of dedicated research to achieve the aforementioned object, the inventors have found that the object can be achieved by a latex composition containing a xanthogen compound and a typical metal compound in a foam other than an oxide in a carboxy-modified polymer latex, thereby accomplishing the present invention.

That is, the present invention provides a latex composition comprising a carboxy-modified polymer latex, a xanthogen compound, and a typical metal compound in a form other than an oxide.

In the latex composition according to the present invention, the typical metal compound is preferably a carbonate, a hydrogen carbonate, a hydroxide, or an organic metal compound containing a typical metal.

In the latex composition according to the present invention, the typical metal constituting the typical metal compound is preferably zinc, magnesium, calcium, aluminum, or lead.

The latex composition according to the present invention preferably further contains a dispersant.

In the latex composition according to the present invention, the xanthogen compound preferably includes two or more xanthogen compounds.

In the latex composition according to the present invention, the carboxy-modified polymer preferably has a degree of modification with carboxyl groups of 0.01 to 10 mol % as calculated based on the formula: (number of carboxyl groups/total number of monomer units of carboxy-modified polymer)×100.

In the latex composition according to the present invention, the carboxy-modified polymer is preferably obtained by modifying a synthetic polyisoprene, a styrene-isoprene-styrene block copolymer, or a protein-free natural rubber with a monomer having a carboxyl group.

The latex composition according to the present invention preferably further contains a sulfur vulcanizing agent.

The present invention further provides a molded film comprising the aforementioned latex composition.

Additionally, the present invention provides a substrate with an adhesive layer, comprising a substrate and an adhesive layer famed on a surface of the substrate and comprising the latex composition.

Effects of Invention

The present invention can provide a latex composition that has excellent stability, can avoid delayed (Type IV) allergic reactions in addition to immediate (Type I) allergic reactions, and can provide a molded film, such as a dip-molded product, having excellent tear strength and tensile strength. The present invention can also provide a molded film and a substrate with an adhesive layer which are obtained using the latex composition.

DESCRIPTION OF EMBODIMENTS

The latex composition according to the present invention contains a carboxy-modified polymer latex, a xanthogen compound, and a typical metal compound in a form other than an oxide.

The carboxy-modified polymer latex used in the present invention is preferably a latex of a carboxy-modified polymer obtained by modifying a conjugated diene polymer or a protein-free natural rubber latex with a monomer having a carboxyl group.

Conjugated Diene Polymer

The conjugated diene polymer is not specifically limited. Examples thereof include synthetic polyisoprenes, styreneisoprene-styrene (SIS) block copolymers, nitrile group-containing conjugated diene copolymers, and the like. Among these, those containing isoprene units such as synthetic polyisoprenes and SIS copolymers are preferable, and synthetic polyisoprenes are particularly preferable.

In the case of using a synthetic polyisoprene as the conjugated diene polymer, the synthetic polyisoprene may be an isoprene homopolymer or may be a copolymer of isoprene with different ethylenically unsaturated monomer(s) that is copolymerizable with isoprene. The content of isoprene units in the synthetic polyisoprene is preferably 70 wt % or more, more preferably 90 wt % or more, further more preferably 95 wt % or more, particularly preferably 100 wt % (homopolymer of isoprene) with respect to the total monomer units for ease of obtaining a molded film, such as a dip-molded product, which is flexible and has excellent tear strength and tensile strength.

Examples of different ethylenically unsaturated monomers that are copolymerizable with isoprene include conjugated diene monomers other than isoprene such as butadiene, chloroprene, and 1,3-pentadiene; ethylenically unsaturated nitrile monomers such as acrylonitrile, methacrylonitrile, fumaronitrile, and α-chloroacrylonitrile; vinyl aromatic monomers such as styrene and alkyl styrenes; ethylenically unsaturated carboxylic acid ester monomers such as methyl (meth)acrylate (which means "methyl acrylate and/or methyl methacrylate", and hereinafter, the same applies to ethyl (meth)acrylate and the like), ethyl (meth)acrylate, butyl (meth)acrylate, and 2-ethylhexyl (meth)acrylate; and the like. One of these ethylenically unsaturated monomers that are copolymerizable with isoprene may be used alone, or two or more of them may be used in combination.

The synthetic polyisoprene can be obtained by conventionally known methods such as solution polymerization of isoprene optionally with different ethylenically unsaturated copolymerizable monomer(s) in an inert polymerization solvent using a Ziegler polymerization catalyst composed of trialkylaluminum-titanium tetrachloride or an alkyl lithium polymerization catalyst such as n-butyl lithium or sec-butyl lithium. Although the polymer solution of synthetic polyisoprene obtained by the solution polymerization may be used as it is to produce a synthetic polyisoprene latex, solid synthetic isoprene may be extracted from the polymer solution and be dissolved in an organic solvent to prepare a solution, which is then used to produce a synthetic polyisoprene latex. As described below, the synthetic polyisoprene latex can be used to produce the carboxy-modified polymer latex used in the present invention.

In the case where a polymer solution of synthetic polyisoprene is obtained by the aforementioned method, impurities such as the residual polymerization catalyst remaining in the polymer solution may be removed. Further, an antioxidant described below may be added to the solution during or after the polymerization. Further, a commercially available solid synthetic polyisoprene can also be used.

There are the following four types of isoprene units in the synthetic polyisoprene which differ in bonding geometry of isoprene units: cis bond unit, trans bond unit, 1,2-vinyl bond unit, and 3,4-vinyl bond unit. In order to obtain a molded film, such as a dip-molded product, having improved tear strength and tensile strength, the content of cis bond units among the isoprene units contained in the synthetic polyisoprene is preferably 70 wt % or more, more preferably 90 wt % or more, further more preferably 95 wt % or more with respect to the total isoprene units.

The weight average molecular weight of the synthetic polyisoprene is preferably 10,000 to 5,000,000, more preferably 500,000 to 5,000,000, further more preferably 800,000 to 3,000,000 as calibrated against a polystyrene standard by gel permeation chromatography. Adjusting the weight average molecular weight of the synthetic polyisoprene within the aforementioned ranges tends to result in a molded film, such as a dip-molded product, having improved tear strength and tensile strength and facilitate the production of the synthetic polyisoprene latex.

Further, the polymer/Mooney viscosity ($ML_{1+4}$ at 100° C.) of the synthetic polyisoprene is preferably 50 to 80, more preferably 60 to 80, further more preferably 70 to 80.

Examples of methods for obtaining the synthetic polyisoprene latex include (1) a method for producing the synthetic polyisoprene latex by emulsifying a solution or microsuspension of the synthetic polyisoprene, which is dissolved or finely dispersed in an organic solvent, in water in the presence of an anionic surfactant, followed by removal of the organic solvent, as required, and (2) a method for directly producing the synthetic polyisoprene latex by emulsion polymerization or suspension polymerization of isoprene alone or a mixture of isoprene with an ethylenically unsaturated monomer copolymerizable with isoprene in the presence of an anionic surfactant. The aforementioned production method (1) is preferable since this method allows the use of a synthetic polyisoprene in which cis bond units occupy a high proportion of the total isoprene units, and tends to result in a molded film, such as a dip-molded product, having excellent mechanical properties such as tensile strength.

Examples of the organic solvent used in the aforementioned production method (1) include aromatic hydrocarbon solvents such as benzene, toluene, and xylene; alicyclic hydrocarbon solvents such as cyclopentane, cyclopentene, cyclohexane, and cyclohexene; aliphatic hydrocarbon solvents such as pentane, hexane, and heptane; halogenated hydrocarbon solvents such as methylene chloride, chloroform, and ethylene dichloride; and the like. Among these, alicyclic hydrocarbon solvents are preferable, and cyclohexane is particularly preferable.

The amount of the organic solvent to be used is preferably 2,000 parts by weight or less, more preferably 20 to 1,500 parts by weight, further more preferably 500 to 1,500 parts by weight with respect to 100 parts by weight of the synthetic polyisoprene.

Examples of the anionic surfactant used in the aforementioned production method (1) include fatty acid salts such as sodium laurate, potassium myristate, sodium palmitate, potassium oleate, sodium linolenate, and sodium rosinate; alkylbenzene sulfonates such as sodium dodecylbenzenesulfonate, potassium dodecylbenzenesulfonate, sodium decylbenzenesulfonate, potassium decylbenzenesulfonate, sodium cetylbenzenesulfonate, and potassium cetylbenzenesulfonate; alkyl sulfosuccinates such as sodium di(2-ethylhexyl) sulfosuccinate, potassium di(2-ethylhexyl) sulfosuccinate, and sodium dioctyl sulfosuccinate; alkyl sulfate ester salts such as sodium lauryl sulfate and potassium lauryl sulfate; polyoxyethylene alkyl ether sulfate ester salts such as sodium polyoxyethylene lauryl ether sulfate and potassium polyoxyethylene lauryl ether sulfate; monoalkyl phosphates such as sodium lauryl phosphate and potassium lauryl phosphate; and the like.

Among these anionic surfactants, fatty acid salts, alkylbenzene sulfonates, alkyl sulfosuccinates, alkyl sulfate ester salts, and polyoxyethylene alkyl ether sulfate ester salts are preferable, and fatty acid salts and alkylbenzene sulfonates are particularly preferable.

Further, the use of at least one selected from the group consisting of alkylbenzene sulfonates, alkyl sulfosuccinates, alkyl sulfate ester salts, and polyoxyethylene alkyl ether sulfate ester salts in combination with fatty acid salts is preferable, and the use of an alkylbenzene sulfonate in combination with a fatty acid salt is particularly preferable, because a slight amount of residual polymerization catalyst (particularly, aluminum and titanium) derived from the synthetic polyisoprene can be more efficiently removed and the generation of aggregates is suppressed in the production of the latex composition. Here, preferred fatty acid salts are sodium rosinate and potassium rosinate, and preferred alkylbenzene sulfonates are sodium dodecylbenzenesulfonate and potassium dodecylbenzenesulfonate. Further, one of these surfactants may be used alone, or two or more of them may be used in combination.

The above-described use of at least one selected from the group consisting of alkylbenzene sulfonates, alkyl sulfosuccinates, alkyl sulfate ester salts, and polyoxyethylene alkyl ether sulfate ester salts in combination with a fatty acid salt results in a latex containing the at least one selected from alkylbenzene sulfonates, alkyl sulfosuccinates, alkyl sulfate ester salts, and polyoxyethylene alkyl ether sulfate ester salts, and the fatty acid salt.

Further, in the aforementioned production method (1), a surfactant other than anionic surfactants may be used in combination, and examples of the surfactant other than anionic surfactants include copolymerizable surfactants such as sulfoesters of α,β-unsaturated carboxylic acids, sulfate esters of α,β-unsaturated carboxylic acids, and sulfoalkyl aryl ethers.

Further, nonionic surfactants such as polyoxyethylene alkyl ethers, polyoxyethylene alkyl phenol ethers, polyoxyethylene alkyl esters, and polyoxyethylene sorbitan alkyl esters may be used in combination as long as they do not inhibit coagulation by a coagulant used in dip-molding.

The amount of the anionic surfactant to be used in the aforementioned production method (1) is preferably 0.1 to 50 parts by weight, more preferably 0.5 to 30 parts by weight with respect to 100 parts by weight of the synthetic polyisoprene. In the case of using two or more surfactants, the total amount of the surfactants to be used preferably falls within the aforementioned ranges. That is, for example, if at least one selected from alkylbenzene sulfonates, alkyl sulfosuccinates, alkyl sulfate ester salts, and polyoxyethylene alkyl ether sulfate ester salts is used in combination with a fatty acid salt, the total amount of these surfactants to be used preferably falls within the aforementioned ranges. The use of an excessively small amount of anionic surfactant may cause a large amount of aggregates during emulsification, or conversely, an excessively large amount thereof is likely to cause foaming, and therefore may result in a molded film, such as a dip-molded product, having pinholes.

Further, if at least one selected from alkylbenzene sulfonates, alkyl sulfosuccinates, alkyl sulfate ester salts, and polyoxyethylene alkyl ether sulfate ester salts is used in combination with a fatty acid salt as anionic surfactants, the ratio of these surfactants to be used is adjusted within a range of preferably 1:1 to 10:1, more preferably 1:1 to 7:1 as a weight ratio of "fatty acid salt":"total of at least one surfactant selected from alkylbenzene sulfonates, alkyl sulfosuccinates, alkyl sulfate ester salts, and polyoxyethylene alkyl ether sulfate ester salts". An excessively large ratio of the at least one surfactant selected from alkylbenzene sulfonates, alkyl sulfosuccinates, alkyl sulfate ester salts, and polyoxyethylene alkyl ether sulfate ester salts may cause intense foaming during handling of the synthetic polyisoprene. This requires processes such as long-term standing and addition of a defoamer, possibly leading to a decrease in workability and an increase in cost.

The amount of water to be used in the aforementioned production method (1) is preferably 10 to 1,000 parts by weight, more preferably 30 to 500 parts by weight, most preferably 50 to 100 parts by weight with respect to 100 parts by weight of the organic solvent solution of the synthetic polyisoprene. Examples of the type of water to be used include hard water, soft water, deionized water, distilled water, zeolite water and the like, and soft water, deionized water, and distilled water are preferable.

As an apparatus for emulsifying the solution or microsuspension of the synthetic polyisoprene, which is dissolved or finely dispersed in the organic solvent, in water in the presence of the anionic surfactant, and in general any apparatus commercially available as an emulsifying machine or a disperser can be used without specific limitation. The anionic surfactant can be added to the solution or microsuspension of the synthetic polyisoprene by any method without limitation, and the anionic surfactant may be added in advance to either or both of water and the solution or microsuspension of the synthetic polyisoprene, or may be added all at once or in portions to a liquid to be emulsified during the emulsification process.

Examples of the emulsifying apparatus include batch emulsifying machines such as "Homogenizer" (product name, manufactured by IKA Works), "POLYTRON" (product name, manufactured by Kinematica AG), and "TK AUTO-HOMO MIXER" (product name, manufactured by Tokushu Kika Kogyo Co., Ltd.); continuous emulsifying machines such as "TK PIPELINE-HOMO MIXER" (product name, manufactured by Tokushu Kika Kogyo Co., Ltd.), "Colloid mill" (product name, manufactured by Shinko Pantec Co., Ltd.), "SLASHER" (product name, manufactured by NIPPON COKE & ENGINEERING CO., LTD.), "Trigonal wet grinder" (product name, manufactured by Mitsui Miike Chemical Engineering Machinery, Co., Ltd.), "CAVITRON" (product name, manufactured by Eurotec, Ltd.), "MILDER" (product name, manufactured by Pacific Machinery & Engineering Co., Ltd.), and "FINE FLOW MILL" (product name, manufactured by Pacific Machinery & Engineering Co., Ltd.); high-pressure emulsifying machines such as "Microfluidizer" (product name, manufactured by MIZUHO INDUSTRIAL CO., LTD.), "NANO-MIZER" (product name, manufactured by NANOMIZER Inc.), and "APV GAULIN" (product name, manufactured by Manton-Gaulin Company); membrane emulsifying machines such as "Membrane emulsifying machine" (product name, manufactured by REICA Co., Ltd.); vibratory emulsifying machines such as "VIBROMIXER" (product name, manufactured by REICA Co., Ltd.); ultrasonic emulsifying machines such as "Ultrasonic homogenizer" (product name, manufactured by Branson Ultrasonics Corporation); and the like. The conditions for the emulsification process using such an emulsifying apparatus are not specifically limited, and the treatment temperature, the treatment time, and the like may be appropriately determined to ensure a desired dispersion state.

In the aforementioned production method (1), the organic solvent is desirably removed from the emulsion obtained by the emulsification process.

As a method for removing the organic solvent from the emulsion, methods that can reduce the content of the organic solvent (preferably an alicyclic hydrocarbon solvent) in the resulting synthetic polyisoprene latex to 500 weight ppm or less are preferable, and methods such as vacuum distillation, normal pressure distillation, water vapor distillation, and centrifugation can be employed, for example.

In the aforementioned method (1), the organic solvent is desirably removed from the emulsion obtained by the aforementioned emulsification process to obtain the synthetic polyisoprene latex. As a method for removing the organic solvent from the emulsion, any method can be used that can reduce the total content of alicyclic hydrocarbon solvents and aromatic hydrocarbon solvents as organic solvents in the resulting synthetic polyisoprene latex to 500 weight ppm or less, and methods such as vacuum distillation, normal pressure distillation, water vapor distillation, and centrifugation can be employed.

Further, in order to increase the solids content of the synthetic polyisoprene latex, a concentration process may be performed as needed by a method such as vacuum distillation, normal pressure distillation, centrifugation, and membrane concentration after removal of the organic solvent. Centrifugation is particularly preferably performed, since the solids content of the synthetic polyisoprene latex can be increased, and the amount of residual surfactant in the synthetic polyisoprene latex can be reduced.

The centrifugation is preferably performed, for example, using a continuous centrifuge under the conditions in which the centrifugal force is preferably 100 to 10,000 G, the solids content of the synthetic polyisoprene latex before centrifugation is preferably 2 to 15 wt %, the feed flow rate into the centrifuge is preferably 500 to 1700 Kg/hr, and the back pressure (gauge pressure) of the centrifuge is preferably 0.03 to 1.6 MPa. The synthetic polyisoprene latex can be obtained as a light liquid after the centrifugation. Further, the amount of residual surfactant in the synthetic polyisoprene latex can be thereby reduced.

The solids content of the synthetic polyisoprene latex is preferably 30 to 70 wt %, more preferably 40 to 70 wt %. When the solids content is excessively low, the solids content of the latex composition described below decreases, and therefore the film thickness of the dip-molded product described below decreases, so that the dip-molded product may easily break. Conversely, when the solids content is excessively high, the synthetic polyisoprene latex has increased viscosity, and therefore may be difficult to transfer through a pipe or stir within a preparation tank in some cases.

The volume average particle size of the synthetic polyisoprene latex is preferably 0.1 to 10 μm, more preferably 0.5 to 3 μm, further more preferably 0.5 to 2.0 μm. Adjusting the volume average particle size within the aforementioned ranges leads to an appropriate viscosity of the latex to ensure ease of handling, and can suppress formation of a film on the surface of the latex during storage of the synthetic polyisoprene latex.

Further, the synthetic polyisoprene latex may contain additives that are generally used in the field of latex, such as pH adjusters, defoamers, preservatives, cross-linking agents, chelating agents, oxygen scavengers, dispersants, and antioxidants.

Examples of the pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine; and the like. Preferred are alkali metal hydroxides and ammonia.

Further, as described above, a styrene-isoprene-styrene block copolymer (SIS) can also be used as the conjugated diene polymer. In the SIS, the character "S" represents a styrene block, and the character "I" represents an isoprene block.

The SIS can be obtained by conventionally known methods such as block copolymerization of isoprene and styrene in an inert polymerization solvent using an active organic metal such as n-butyl lithium as an initiator. Although the resulting polymer solution of SIS may be used as it is to produce an SIS latex, solid SIS may be extracted from the polymer solution and be dissolved in an organic solvent to prepare a solution, which is then used to produce an SIS latex. As described below, the SIS latex can be used to produce the carboxy-modified polymer latex used in the present invention. Any method for producing the SIS latex can be used without limitation, but preferred is a method for producing the SIS latex by emulsifying a solution or microsuspension of SIS, which is dissolved or finely dispersed in an organic solvent, in water in the presence of a surfactant and removing the organic solvent as required.

At this time, impurities such as the residual polymerization catalyst remaining in the polymer solution after the synthesis may be removed. Further, an antioxidant described below may be added to the solution during or after the polymerization. Further, a commercially available solid SIS can also be used.

As the organic solvent, the same organic solvents as described above for the synthetic polyisoprene can be used. Preferred are aromatic hydrocarbon solvents and alicyclic hydrocarbon solvents, and particularly preferred are cyclohexane and toluene.

The amount of the organic solvent to be used is generally 50 to 2,000, preferably 80 to 1,000 parts by weight, more preferably 10 to 500 parts by weight, further more preferably 150 to 300 parts by weight with respect to 100 parts by weight of the SIS.

Examples of the surfactant include the same surfactants as described above for the synthetic polyisoprene. Anionic surfactants are suitable, and sodium rosinate and sodium dodecylbenzene sulfonate are particularly preferable.

The amount of the surfactant to be used is preferably 0.1 to 50 parts by weight, more preferably 0.5 to 30 parts by weight with respect to 100 parts by weight of the SIS. An excessively small amount of surfactant tends to result in a latex having poor stability, or conversely, an excessively large amount thereof is likely to cause foaming, possibly leading to a problem during dip-molding.

The amount of water to be used in the aforementioned method for producing the SIS latex is preferably 10 to 1,000 parts by weight, more preferably 30 to 500 parts by weight, most preferably 50 to 100 parts by weight with respect to 100 parts by weight of the organic solvent solution of the SIS. Examples of the type of water to be used include hard water, soft water, deionized water, distilled water, and zeolite water, and the like. Further, polar solvents typified by alcohols such as methanol may be used in combination with water.

Examples of apparatuses for emulsifying the organic solvent solution or microsuspension of the SIS in water in the presence of the surfactant include the same apparatuses as described above for the synthetic polyisoprene. The surfactant can be added by any method without limitation, and the surfactant may be added in advance to either or both of water and the organic solvent solution or microsuspension of the SIS, or may be added all at once or in portions to a liquid to be emulsified during the emulsification process.

In the aforementioned method for producing the SIS latex, the SIS latex is preferably obtained by removing the organic solvent from the emulsion obtained by the emulsification process. The organic solvent can be removed from the emulsion by any method without limitation, and methods such as vacuum distillation, normal pressure distillation, water vapor distillation, and centrifugation can be employed.

Further, in order to increase the solids content of the SIS latex, a concentration process may be pertained as needed by a method such as vacuum distillation, normal pressure distillation, centrifugation, or membrane concentration after removal of the organic solvent.

The solids content of the SIS latex is preferably 30 to 70 wt %, more preferably 50 to 70 wt %. When the solids content is excessively low, the solids content of the latex composition described below decreases, resulting in a thin dip-molded product which may easily break. Conversely, when the solids content is excessively high, the SIS latex has increased viscosity, and therefore may be difficult to transfer through a pipe or stir within a preparation tank in some cases.

Further, the SIS latex may contain additives generally used in the field of latex, such as pH adjusters, defoamers, preservatives, cross-linking agents, chelating agents, oxygen scavengers, dispersants, and antioxidants. Examples of the pH adjusters include the same pH adjusters as those described above for the synthetic polyisoprene. Preferred are alkali metal hydroxides and ammonia.

The content of styrene units in styrene blocks of the SIS contained in the SIS latex thus obtained is preferably 70 to 100 wt %, more preferably 90 to 100 wt %, further more preferably 100 wt % with respect to the total monomer units.

Further, the content of isoprene units in isoprene blocks of the SIS is preferably 70 to 100 wt %, more preferably 90 to 100 wt %, further more preferably 100 wt % with respect to the total monomer units.

The content ratio of styrene units to isoprene units in the SIS is generally in the range of 1:99 to 90:10, preferably 3:97 to 70:30, more preferably 5:95 to 50:50, further more preferably 10:90 to 30:70 as a weight ratio of "styrene units:isoprene units".

The weight average molecular weight of the SIS is preferably 10,000 to 1,000,000, more preferably 50,000 to 500,000, further more preferably 100,000 to 300,000 as calibrated against a polystyrene standard by gel permeation chromatography. Adjusting the weight-average molecular weight of the SIS within the aforementioned ranges tends to result in a molded film, such as a dip-molded product, having improved balance of tear strength, tensile strength, and flexibility, and facilitate the production of the SIS latex.

The volume average particle size of latex particles (SIS particles) in the SIS latex is preferably 0.1 to 10 μm, more preferably 0.5 to 3 μm, further more preferably 0.5 to 2.0 μm. Adjusting the volume average particle size of the latex particles within the aforementioned ranges leads to an appropriate viscosity of the latex to ensure ease of handling, and can suppress formation of a film on the surface of the latex during storage of the SIS latex.

Further, a nitrile group-containing conjugated diene copolymer can also be used as the conjugated diene polymer as described above.

The nitrile group-containing conjugated diene copolymer is any of copolymers famed by copolymerization of ethylenically unsaturated nitrile monomers with conjugated diene monomers, and may be any of copolymers famed by copolymerization of these monomers with different ethylenically unsaturated monomer(s) that is copolymerizable with the former monomers and is used as needed in addition to the former monomers.

Examples of the conjugated diene monomer include 1,3-butadiene, isoprene, 2,3-dimethyl-1,3-butadiene, 2-ethyl-1,3-butadiene, 1,3-pentadiene, chloroprene, and the like. Among these, 1,3-butadiene and isoprene are preferable, and 1,3-butadiene is more preferable. One of these conjugated diene monomers can be used alone, or two or more of them can be used in combination. The content of conjugated diene monomer units famed from the conjugated diene monomer in the nitrile group-containing conjugated diene copolymer is preferably 56 to 78 wt %, more preferably 56 to 73 wt %, further more preferably 56 to 68 wt %. Adjusting the content of conjugated diene monomer units within the aforementioned ranges can result in a molded film, such as a dip-molded product, having sufficient tear strength and tensile strength and having a further improved texture and further improved elongation.

As the ethylenically unsaturated nitrile monomer, any ethylenically unsaturated monomer containing a nitrile group can be used without limitation. Examples thereof include acrylonitrile, methacrylonitrile, fumaronitrile, α-chloroacrylonitrile, cyanoethylacrylonitrile, and the like. Among these, acrylonitrile and methacrylonitrile are preferable, and acrylonitrile is more preferable. One of these ethylenically unsaturated nitrile monomers can be used alone, or two or more of them can be used in combination. The content of ethylenically unsaturated nitrile monomer units famed from the ethylenically unsaturated nitrile monomer in the nitrile group-containing conjugated diene copolymer is preferably 20 to 40 wt %, more preferably 25 to 40 wt %, further more preferably 30 to 40 wt %. Adjusting the content of the ethylenically unsaturated nitrile monomer units within the aforementioned ranges can result in a molded film, such as a dip-molded product, having sufficient tear strength and tensile strength and having a further improved texture and further improved elongation.

Examples of different ethylenically unsaturated monomers that are copolymerizable with the conjugated diene monomer and the ethylenically unsaturated nitrile monomer include ethylenically unsaturated carboxylic acid monomers that are ethylenically unsaturated monomers containing a carboxyl group; vinyl aromatic monomers such as styrene, alkyl styrenes, and vinylnaphthalene; fluoroalkyl vinyl ethers such as fluoroethyl vinyl ether; ethylenically unsaturated amide monomers such as (meth)acrylamide, N-methylol (meth)acrylamide, N,N-dimethylol (meth)acrylamide, N-methoxymethyl (meth)acrylamide, and N-propoxymethyl (meth)acrylamide; ethylenically unsaturated carboxylic acid ester monomers such as methyl (meth)acrylate, ethyl (meth) acrylate, buthyl (meth) acrylate, 2-ethylhexyl (meth) acrylate, trifluoroethyl (meth) acrylate, tetrafluoropropyl (meth) acrylate, dibutyl maleate, dibutyl fumarate, diethyl maleate, methoxymethyl (meth)acrylate, ethoxyethyl (meth)acrylate, methoxyethoxyethyl (meth) acrylate, cyanomethyl (meth) acrylate, 2-cyanoethyl (meth)acrylate, 1-cyanopropyl (meth)acrylate, 2-ethyl-6-cyanohexyl (meth) acrylate, 3-cyanopropyl (meth) acrylate, hydroxyethyl (meth)acrylate, hydroxypropyl (meth)acrylate, glycidyl (meth)acrylate, and dimethylaminoethyl (meth)acrylate; cross-linkable monomers such as divinylbenzene, polyethylene glycol di(meth)acrylate, polypropylene glycol di(meth)acrylate, trimethylolpropane tri(meth)acrylate, and pentaerythritol (meth)acrylate; and the like. One of these ethylenically unsaturated monomers can be used alone, or two or more of them can be used in combination.

The ethylenically unsaturated carboxylic acid monomer may be any ethylenically unsaturated monomer containing a carboxyl group. Examples thereof include ethylenically unsaturated monocarboxylic acid monomers such as acrylic acid and methacrylic acid; ethylenically unsaturated polyvalent carboxylic acid monomers such as itaconic acid, maleic acid, and fumaric acid; ethylenically unsaturated polyvalent carboxylic acid anhydrides such as maleic anhydride and citraconic anhydride; ethylenically unsaturated polyvalent carboxylic acid partial ester monomers such as monobutyl fumarate, monobutyl maleate, and mono-2-hydroxypropyl maleate; and the like. Among these, ethylenically unsaturated monocarboxylic acids are preferable, and methacrylic acid is particularly preferable. The ethylenically unsaturated carboxylic acid monomers can also be used as alkali metal salts or ammonium salts. Further, one of these ethylenically unsaturated carboxylic acid monomers can be used alone, or two or more of them can be used in combination. The content of ethylenically unsaturated carboxylic acid monomer units foamed from the ethylenically unsaturated carboxylic acid monomer in the nitrile group-containing conjugated diene copolymer is preferably 2 to 5 wt %, more preferably 2 to 4.5 wt %, further more preferably 2.5 to 4.5 wt %. Adjusting the content of the ethylenically unsaturated carboxylic acid monomer units within the aforementioned ranges can result in a molded film, such as a dip-molded product, having sufficient tear strength and tensile strength and having a further improved texture and further improved elongation.

The content of other monomer units famed from the different ethylenically unsaturated monomer(s) in the nitrile group-containing conjugated diene copolymer is preferably 10 wt % or less, more preferably 5 wt % or less, further more preferably 3 wt % or less.

The nitrile group-containing conjugated diene copolymer can be obtained by copolymerization of a monomer mixture containing the aforementioned monomers, but a preferred method is copolymerization by emulsion polymerization. As an emulsion polymerization method, a conventionally known method can be employed.

In the emulsion polymerization of the monomer mixture containing the aforementioned monomers, polymerization auxiliary materials generally used, such as emulsifiers, polymerization initiators, and molecular weight modifiers, can be used. These polymerization auxiliary materials can be added by any method without limitation, and any method such as initial one-time addition, portion-wise addition, and continuous addition may be employed.

The emulsifiers are not specifically limited, and examples thereof can include nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as alkylbenzene sulfonates including potassium dodecylbenzene sulfonate and sodium dodecylbenzene sulfonate, higher alcohol sulfate salts, and alkyl sulfosuccinates; cationic emulsifiers such as alkyl trimethyl ammonium chlorides, dialkyl ammonium chlorides, and benzyl ammonium chloride; copolymerizable emulsifiers such as sulfoesters of α,β-unsaturated carboxylic acids, sulfate esters of α,β-unsaturated carboxylic acids, and sulfoalkyl aryl ethers; and the like. Among these, anionic emulsifiers are preferable, alkylbenzene sulfonates are more preferable, and potassium dodecylbenzene sulfonate and sodium dodecylbenzene sulfonate are particularly preferable. One of these emulsifiers can be used alone, or two or more of them can be used in combination. The amount of emulsifiers to be used is preferably 0.1 to 10 parts by weight with respect to 100 parts by weight of the monomer mixture.

The polymerization initiators are not specifically limited, and examples thereof include inorganic peroxides such as sodium persulfate, potassium persulfate, ammonium persulfate, potassium superphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide, and benzoyl peroxide; azo compounds such as azobisisobutyronitrile, azobis-2,4-dimethylvaleronitrile, and methyl azobisisobutyrate; and the like. One of these polymerization initiators can be used alone, or two or more of them can be used in combination. The amount of polymerization initiators to be used is preferably 0.01 to 10 parts by weight, more preferably 0.01 to 2 parts by weight with respect to 100 parts by weight of the monomer mixture.

Further, the peroxide initiators can be used in combination with reductants as redox polymerization initiators. Although the reductants are not specifically limited, examples thereof include compounds containing reduced metal ions such as ferrous sulfate and cuprous naphthenate; sulfonic acid compounds such as sodium methanesulfonate; amine compounds such as dimethylaniline; and the like. One of these reductants can be used alone, or two or more of them can be used in combination. The amount of reductants to be used is preferably 3 to 1000 parts by weight with respect to 100 parts by weight of the peroxides.

The amount of water to be used in the emulsion polymerization is preferably 80 to 600 parts by weight, particularly preferably 100 to 200 parts by weight with respect to 100 parts by weight of all monomers to be used.

Examples of methods for adding monomers include a method of adding monomers to be used into a reactor all at once, a method of adding monomers continuously or intermittently as the polymerization proceeds, a method of adding a portion of monomers to react the monomers to a specific conversion ratio and then adding the remaining monomers continuously or intermittently to complete polymerization, and the like. Any one of these methods may be employed. In the case of mixing monomers and thereafter adding the mixture continuously or intermittently, the composition of the mixture may be fixed or varied. Further, the monomers may be mixed in advance and then added into the reactor, or may be separately added into the reactor.

Further, polymerization auxiliary materials such as chelating agents, dispersants, pH adjusters, oxygen scavengers, and particle size modifiers can be used as required, and both of the type and the amount of these polymerization auxiliary materials to be used are not specifically limited.

The polymerization temperature during the emulsion polymerization, although not specifically limited, is generally 3 to 95° C., preferably 5 to 60° C. The polymerization time is about 5 to 40 hours.

The monomer mixture is subjected to emulsion polymerization as described above, and the polymerization reaction is stopped by cooling the polymerization system or adding a polymerization terminator at the time when a predetermined polymerization conversion ratio is reached. The polymerization conversion ratio at which the polymerization reaction is stopped is preferably 90 wt % or more, more preferably 93 wt % or more.

Although the polymerization terminator is not specifically limited, examples thereof include hydroxylamine, hydroxyamine sulfate, diethylhydroxylamine, hydroxyaminesulfonic acid and alkali metal salts thereof, sodium dimethyldithiocarbamate, hydroquinone derivatives, catechol derivatives, and aromatic hydroxydithiocarboxylic acids such as hydroxydimethylbenzenethiocarboxylic acid, hydroxydiethylbenzenedithiocarboxylic acid, and hydroxydibutylbenzenedithiocarboxylic acid, and alkali metal salts thereof, and the like. The amount of the polymerization terminator to be used is preferably 0.05 to 2 parts by weight with respect to 100 parts by weight of the monomer mixture.

After the polymerization reaction is stopped, as needed, unreacted monomers are removed, and the solids content and the pH are adjusted, so that a latex of the nitrile group-containing conjugated diene copolymer can be obtained.

Further, antioxidants, preservatives, antibacterial agents, dispersants, and the like may be appropriately added to the latex of the nitrile group-containing conjugated diene copolymer as required.

The number average particle size of the latex of the nitrile group-containing conjugated diene copolymer is preferably 60 to 300 nm, more preferably 80 to 150 nm. The particle size can be adjusted to a desired value, for example, by controlling the amounts of emulsifiers and polymerization initiators to be used.

Although a synthetic polyisoprene, a styrene-isoprene-styrene block copolymer (SIS), a nitrile group-containing conjugated diene copolymer, and the like can be used as the carboxy-modified polymer used in the present invention as described above, the carboxy-modified polymer is not limited to these examples, and a butadiene polymer, a styrene-butadiene copolymer, and the like may be used.

The butadiene polymer may be a homopolymer of 1,3-butadiene as a conjugated diene monomer, or may be a copolymer famed by copolymerization of 1,3-butadiene as a conjugated diene monomer with different ethylenically unsaturated monomer(s) that is copolymerizable with 1,3-butadiene.

Further, the styrene-butadiene copolymer may be a copolymer famed by copolymerization of 1,3-butadiene as a conjugated diene monomer with styrene, or may be a copolymer famed by copolymerization of these monomers with different ethylenically unsaturated monomer(s) that is copolymerizable with the former monomers and is used as required in addition to the former monomers.

As the carboxy-modified polymer latex used in the present invention, a latex of a protein-free natural rubber (deproteinized natural rubber) may be used instead of the aforementioned conjugated diene polymer latex. Examples of the deproteinized natural rubber latex include those known as "deproteinized natural rubber latices" obtainable by known protein removal methods such as a method involving decomposing proteins in a natural rubber latex with a protease or a surfactant, for example, and removing the decomposed products by washing or centrifugation.

The deproteinized natural rubber latex is preferably controlled to have a solids content within the same ranges as those for the solids content of the aforementioned conjugated diene polymer latex, and may be prepared using the same additives as above.

Carboxy-Modified Polymer Latex

The carboxy-modified polymer constituting the carboxy-modified polymer latex used in the present invention can be obtained by modifying the conjugated diene polymer or the deproteinized natural rubber with a monomer having a carboxyl group. In the case where the conjugated diene polymer is a polymer containing ethylenically unsaturated carboxylic acid units, the conjugated diene polymer can be used as it is as the carboxy-modified polymer without being modified with the monomer having a carboxyl group.

According to the present invention, the use of the carboxy-modified polymer latex can suppress the occurrence of aggregates in the resulting latex composition, thereby reducing the frequency of defective molded films in the production of molded films, such as dip-molded products, using the latex composition. Further, the use of the carboxy-modified polymer latex can result in a latex composition which provides a molded film, such as a dip-molded product, having improved tear strength and tensile strength.

Any method for modifying the conjugated diene polymer or the deproteinized natural rubber with the monomer having a carboxyl group can be used without limitation. Examples thereof include a method of graft-polymerizing the monomer having a carboxyl group onto the conjugated diene polymer or the deproteinized natural rubber in a water phase. Any method can be used without limitation to graft-polymerize the monomer having a carboxyl group onto the conjugated diene polymer or the deproteinized natural rubber in a water phase, and conventionally known methods may be used. Preferred examples thereof include a method of adding the monomer having a carboxyl group and an organic peroxide to the conjugated diene polymer latex or the deproteinized natural rubber latex and thereafter reacting the conjugated diene polymer or the deproteinized natural rubber with the monomer having a carboxyl group in the water phase.

Although the organic peroxide is not specifically limited, examples thereof include diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, benzoyl peroxide, and the like. In order to obtain a dip-molded product having improved mechanical strength, 1,1,3,3-tetramethylbutyl hydroperoxide is particularly preferable. One of these organic peroxides may be used alone, or two or more of them may be used in combination.

Although the amount of the organic peroxide to be added is not specifically limited, the amount is preferably 0.01 to 3 parts by weight, more preferably 0.1 to 1 part by weight with respect to 100 parts by weight of the conjugated diene polymer or the deproteinized natural rubber contained in the latex.

Further, the organic peroxide can be used as a redox polymerization initiator in combination with a reductant. Although the reductant is not specifically limited, examples thereof include compounds containing reduced metal ions such as ferrous sulfate and cuprous naphthenate; sulfonic acid compounds such as sodium methanesulfonate; amine compounds such as dimethylaniline; and the like. One of these reductants may be used alone, or two or more of them may be used in combination.

The amount of the reductant to be added, although not specifically limited, is preferably 0.01 to 1 part by weight with respect to 1 part by weight of the organic peroxide.

Any method for adding the organic peroxide and the reductant can be used without limitation, and known addition methods such as one-time addition, portion-wise addition, and continuous addition can be used.

The reaction of the conjugated diene polymer or the deproteinized natural rubber with the monomer having a carboxyl group is preferably performed in the presence of a dispersant.

The dispersant is not specifically limited. Preferred are anionic surfactants such as aromatic sulfonic acid derivatives, fatty acid salts, alkylbenzene sulfonates, alkyl sulfosuccinates, alkyl sulfate ester salts, polyoxyethylene alkyl ether sulfate ester salts, and monoalkyl phosphates, and more preferred are aromatic sulfonic acid derivatives. One of these dispersants may be used alone, or two or more of these may be used in combination.

Any aromatic sulfonic acid derivative can be used without limitation, but compounds represented by general formula (1) are preferable.

[Chem 1]

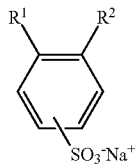

(1)

(In general formula (1), $R^1$ and $R^2$ are independently a hydrogen atom or any organic group, and may be linked together to form a ring structure.)

In the case where $R^1$ and $R^2$ are not linked together, $R^1$ and $R^2$ may be any organic groups without limitation. Examples thereof include $C_{1-30}$ alkyl groups such as a methyl group, an ethyl group, a n-propyl group, an isopropyl group, a n-butyl group, an isobutyl group, a sec-butyl group, a t-butyl group, a n-pentyl group, a n-hexyl group, a n-heptyl group, a n-octyl group, a n-nonyl group, and a n-decyl group; $C_{3-30}$ cycloalkyl groups such as a cyclopropyl group, a cyclopentyl group, a cyclohexyl group, a cycloheptyl group, and a cyclooctyl group; $C_{6-3}$ aryl groups such as a phenyl group, a biphenyl group, a naphthyl group, and an anthranil group; $C_{1-30}$ alkoxy groups such as a methoxy group, an ethoxy group, a n-propoxy group, an isopropoxy group, a n-butoxy group, an isobutoxy group, a sec-butoxy group, a t-butoxy group, a n-pentyloxy group, a n-hexyloxy group, and a phenoxy group; and the like. These organic groups may have a substituent at any position thereof.

In the case where $R^1$ and $R^2$ are linked together to form a ring structure, the ring structure is not specifically limited. Preferred are aromatic compounds, more preferred are benzene ring-containing aromatic compounds such as benzene and naphthalene, and particularly preferred is naphthalene. These ring structures may have a substituent at any position thereof.

In the present invention, examples of particularly preferred aromatic sulfonic acid derivatives among the compounds represented by general formula (1) include those in which $R^1$ and $R^2$ are linked together to form a ring structure, so that a benzene ring is present in general formula (1). More specifically, compounds having a structure represented by general formula (2) below are preferably used.

[Chem 2]

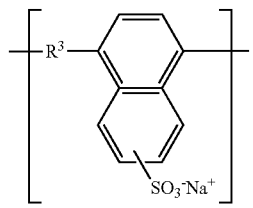

(2)

(In general formula (2), $R^3$ is a divalent hydrocarbon group optionally having a substituent.)

In general formula (2), $R^3$ may be any dtvalent hydrocarbon group optionally having a substituent, and is not specifically limited. Preferred are $C_{1-10}$ alkylene groups, and particularly preferred is a methylene group.

Additionally, preferred aromatic sulfonic acid derivatives have repeating structures represented by general formula (2). The number of repeating structures represented by general formula (2), although not specifically limited, is preferably 10 to 100, more preferably 20 to 50.

The weight average molecular weight of the aromatic sulfonic acid derivatives is preferably 500 to 100,000, more preferably 3,000 to 50,000, further more preferably 5,000 to 30,000.

Although the amount of the dispersant to be added is not specifically limited, the amount is preferably 0.01 to 10 parts by weight, more preferably 0.1 to 5 parts by weight with respect to 100 parts by weight of the conjugated diene polymer or the deproteinized natural rubber contained in the latex in order to more effectively prevent the occurrence of aggregates even when the conjugated diene polymer latex or the deproteinized natural rubber latex has a high solids content.

The dispersant can be added to the conjugated diene polymer latex or the deproteinized natural rubber latex by any method, and known addition methods, such as one-time addition, portion-wise addition, and continuous addition, can be used. The dispersant may be directly added to the latex, or may be famed into an aqueous solution, which is then added to the latex.

The reaction temperature for the reaction of the conjugated diene polymer or the deproteinized natural rubber with the monomer having a carboxyl group, although not specifically limited, is preferably 15 to 80° C., more preferably 30 to 50° C. Although the reaction time for the reaction with the monomer having a carboxyl group may be appropriately set according to the aforementioned reaction temperature, the reaction time is preferably 30 to 300 minutes, more preferably 60 to 120 minutes.

The solids content of the conjugated diene polymer latex or the deproteinized natural rubber latex in the reaction with the monomer having a carboxyl group, although not specifically limited, is preferably 5 to 60 wt %, more preferably 10 to 40 wt %.

Examples of the monomer having a carboxyl group can include ethylenically unsaturated monocarboxylic acid monomers such as acrylic acid and methacrylic acid; ethylenically unsaturated polyvalent carboxylic acid monomers such as itaconic acid, maleic acid, fumaric acid, and butene tricarboxylic acid; partial ester monomers of ethylenically unsaturated polyvalent carboxylic acids such as monobutyl fumarate, monobutyl maleate, and mono-2-hydroxypropyl maleate; polyvalent carboxylic acid anhydrides such as maleic anhydride and citraconic anhydride; and the like. Ethylenically unsaturated monocarboxylic acid monomers are preferable, and acrylic acid and methacrylic acid are particularly preferable because further remarkable effects of the present invention are achieved. One of these monomers may be used alone, or two or more of them may be used in combination.

Further, the aforementioned carboxyl group includes those in the form of salts with alkali metals, ammonia, and the like.

The amount of the monomer having a carboxyl group to be used is preferably 0.01 parts by weight to 100 parts by weight, more preferably 0.01 parts by weight to 40 parts by weight, further more preferably 0.5 parts by weight to 20 parts by weight with respect to 100 parts by weight of the conjugated diene polymer or the deproteinized natural rubber. Adjusting the amount of the monomer having a carboxyl group to be used within the aforementioned ranges results in a latex composition that has an appropriate viscosity and therefore is easy to transfer, and the use of the resulting latex composition results in a molded film, such as a dip-molded product, having further improved tear strength and tensile strength.

The monomer having a carboxyl group to the polymer latex can be added by any method without limitation, and known addition methods such as one-time addition, portion-wise addition, and continuous addition can be employed.

The degree of modification of the carboxy-modified polymer with the monomer having a carboxyl group may be appropriately controlled according to the intended use of the latex composition to be obtained but is preferably 0.01 to 10 mol %, more preferably 0.5 to 5 mol %. The degree of modification is represented by formula (i) below.

$$\text{Degree of modification (mol \%)} = (X/Y) \times 100 \quad \text{(i)}$$

In formula (i) above, X represents the number of carboxyl groups in the carboxy-modified polymer, and Y represents the total number of monomer units in the carboxy-modified polymer. X can be determined by examining the carboxy-modified polymer by $^1$H-NMR. Further, Y can be determined by calculating the value of (weight average molecular weight (Mw) of carboxy-modified polymer)/(average molecular weight of monomers based on contents of respective monomer units constituting carboxy-modified polymer (average molecular weight of monomer mixture)).

Any polymerization catalyst (graft polymerization catalyst) can be used in the graft polymerization without limitation. Examples thereof can include inorganic peroxides such as sodium persulfate, potassium persulfate, ammonium persulfate, potassium superphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide; azo compounds such as 2,2'-azobisisobutyronitrile, azobis-2,4-dimethyl-valeronitrile, and methyl azobisisobutyrate, and the like. In order to obtain a molded film, such as a dip-molded product, having further improved tear strength and tensile strength, organic peroxides are preferable, and 1,1,3,3-tetramethylbutyl hydroperoxide is particularly preferable.

One of the aforementioned graft polymerization catalysts can be used alone, or two or more of them can be used in combination. Although the amount of the graft polymerization catalyst to be used varies depending on the type, the amount is preferably 0.1 to 10 parts by weight, more preferably 0.2 to 5 parts by weight with respect to 100 parts by weight of the conjugated diene polymer or the depro-teinized natural rubber. Further, the graft polymerization catalyst can be added by any method without limitation, and known addition methods, such as one-time addition, divided addition, and continuous addition, can be employed.

The conversion ratio of the graft polymerization is preferably 95 wt % or more, more preferably 97 wt % or more. Adjusting the conversion ratio of the graft polymerization within the aforementioned ranges results in a molded film, such as a dip-molded product, having further improved tear strength and tensile strength.

The carboxy-modified polymer latex used in the present invention may contain additives that are generally used in the field of latex, such as pH adjusters, defoamers, preservatives, chelating agents, oxygen scavengers, dispersants, and antioxidants.

Examples of the pH adjusters include alkali metal hydroxides such as sodium hydroxide and potassium hydroxide; alkali metal carbonates such as sodium carbonate and potassium carbonate; alkali metal hydrogen carbonates such as sodium hydrogen carbonate; ammonia; organic amine compounds such as trimethylamine and triethanolamine; and the like. Preferred are alkali metal hydroxides and ammonia.

Further, in order to increase the solids content of the carboxy-modified polymer latex, a concentration process may be performed as needed by a method such as vacuum distillation, normal pressure distillation, centrifugation, or membrane concentration after the graft polymerization. Centrifugation is preferably performed since the amount of residual anionic surfactant in the carboxy-modified polymer latex can be adjusted.

In the case where the carboxy-modified polymer latex after the graft polymerization is treated in a centrifuge, the pH of the latex is preferably adjusted by adding a pH adjuster in advance to 7 or more, more preferably to 9 or more in order to improve the mechanical stability of the latex. As a result of adjusting the pH of the latex, the carboxyl groups introduced by modification may be in the form of a salt.

The solids content of the carboxy-modified polymer latex according to the present invention is preferably 30 to 70 wt %, more preferably 40 to 70 wt %. Adjusting the solids content within the aforementioned ranges can more effectively suppress the occurrence of aggregates in the latex and can more effectively suppress separation of polymer particles during storage of the latex.

Further, the content of monomer units having a carboxyl group in the carboxy-modified polymer is preferably 0.01 to 50 wt %, more preferably 0.5 to 40 wt %, further more preferably 1 to 30 wt %, particularly preferably 1 to 15 wt % with respect to all monomer units. Adjusting the content of monomer units having a carboxyl group within the aforementioned ranges results in a latex composition having further improved mechanical stability, and the use of the resulting latex composition results in a dip-molded product having further improved flexibility, tear strength, and tensile strength.

Xanthogen Compound

The latex composition according to the present invention contains a xanthogen compound in addition to the aforementioned carboxy-modified polymer latex.

The xanthogen compound used in the present invention can act as a vulcanization accelerator when used in combination with a sulfur vulcanizing agent, for example. That is, in the case where a molded film such as a dip-molded product is famed by mixing the latex composition with a sulfur vulcanizing agent and vulcanizing the carboxy-modified polymer in the latex composition by the sulfur vulcanizing agent, the xanthogen compound acts as a vulcanization accelerator. Further, the xanthogen compound acts as a vulcanization accelerator in the latex composition mixed with the sulfur vulcanizing agent and is decomposed into, for example, alcohol and carbon disulfide after the vulcanization, due to the heat applied during the vulcanization. For example, the xanthogen compound is decomposed into alcohol and carbon disulfide due to the heat applied during the production of the molded film (heat at about 100 to 130° C. in the vulcanization of the carboxy-modified polymer), and then the components (such as alcohol and carbon disulfide) generated by the decomposition volatilize. This can reduce the amount of residual xanthogen compound in the resulting molded film. The present invention uses the xanthogen compound as a vulcanization accelerator without using conventional vulcanization accelerators (such as dithiocarbamate vulcanization accelerators and thiazole vulcanization accelerators) which trigger delayed (Type IV) allergic reactions, and can provide a molded film, such as a dip-molded product, containing a reduced amount of residual xanthogen compound. Therefore, the resulting molded film can avoid delayed (Type IV) allergic reactions. Moreover, in the latex composition according to the present invention, the carboxy-modified polymer prepared using a synthetic rubber, such as a conjugated diene polymer, or a deproteinized natural rubber is used, and therefore the resulting molded film can avoid immediate (Type I) allergic reactions caused by proteins contained in natural rubber.

Although the xanthogen compound used in the present invention is not specifically limited, examples thereof include xanthic acids, xanthates, xanthogen disulfides (compounds with two xanthic acid molecules bound via a sulfur atom or the like), xanthogen polysulfides (compounds with three or more xanthic acid molecules bound via sulfur atoms or the like), and the like.

The xanthates are not specifically limited, and may be any compounds having a xanthate structure. Examples thereof include compounds represented by the general formula (ROC(=S)S)x–Z (where R represents a linear or branched hydrocarbon, Z represents a metal atom, and x represents a numerical value that matches the valence of Z and is generally 1 to 4, preferably 2 to 4, particularly preferably 2).

Although the xanthates represented by the general formula (ROC(=S)S)x–Z are not specifically limited, examples thereof include zinc dimethyl xanthate, zinc diethyl xanthate, zinc dipropyl xanthate, zinc diisopropyl xanthate, zinc dibutyl xanthate, zinc dipentyl xanthate, zinc dihexyl xanthate, zinc diheptyl xanthate, zinc dioctyl xanthate, zinc di(2-ethylhexyl) xanthate, zinc didecyl xanthate, zinc didodecyl xanthate, potassium dimethyl xanthate, potassium ethyl xanthate, potassium propyl xanthate, potassium isopropyl xanthate, potassium butyl xanthate, potassium pentyl xanthate, potassium hexyl xanthate, potassium heptyl xanthate, potassium octyl xanthate, potassium 2-ethylhexyl xanthate, potassium decyl xanthate, potassium dodecyl xanthate, sodium methyl xanthate, sodium ethyl xanthate, sodium propyl xanthate, sodium isopropyl xanthate, sodium butyl xanthate, sodium pentyl xanthate, sodium hexyl xanthate, sodium heptyl xanthate, sodium octyl xanthate, sodium 2-ethylhexyl xanthate, sodium decyl xanthate, sodium dodecyl xanthate, and the like. Xanthates with x in the general formula (ROC(=S)S)x–Z being 2 or more are preferable, isopropyl xanthates and butyl xanthates are more preferable, and zinc diisopropyl xanthate and zinc dibutyl xanthate are particularly preferable. One of these xanthates may be used alone, or two or more of them may be used in combination.

The xanthogen disulfides are compounds with two xanthic acid molecules bound via sulfur atoms or the like and are not specifically limited. Examples thereof include dimethyl xanthogen disulfide, diethyl xanthogen disulfide, diisopropyl xanthogen disulfide, dibutyl xanthogen disulfide, dimethyl xanthogen polysulfide, diethyl xanthogen polysulfide, diisopropyl xanthogen polysulfide, dibutyl xanthogen polysulfide, and the like. Among these, diisopropyl xanthogen disulfide and dibutyl xanthogen disulfide are preferable.

The xanthogen polysulfides are compounds with three or more xanthic acid molecules bound via sulfur atoms or the like, and examples thereof include xanthogen trisulfides with three xanthic acid molecules bound via sulfur, xanthogen tetrasulfides with four xanthic acid molecules bound via sulfur, xanthogen pentasulfides with five xanthic acid molecules bound via sulfur, and the like.

Although the latex composition according to the present invention may contain one of these xanthogen compounds alone, the latex composition preferably contains a combination of two or more of them. For example, in the case where the latex composition contains a xanthic acid, two or more xanthogen compounds may be present in the latex composition because the xanthic acid contained is partially present in the form of a xanthate due to the action of the typical metal compound present in the latex composition. Alternatively, in the case where sulfur is contained in the latex composition as a sulfur vulcanizing agent or the like, the xanthic acid contained in the latex composition may be present in the form of a xanthogen disulfide or a xanthogen polysulfide due to the action of sulfur. Likewise, also in the case where a xanthate, a xanthogen disulfide, or a xanthogen polysulfide is mixed with the latex composition, these each may be present in the form of any one of a xanthic acid, a xanthate, a xanthogen disulfide, and a xanthogen polysulfide.

The content of the xanthogen compound (in the case where a plurality of xanthogen compounds are contained in the latex composition, the total content thereof) in the latex composition according to the present invention is preferably 0.01 to 10 parts by weight, more preferably 0.1 to 7 parts by weight, further more preferably 0.5 to 5 parts by weight with respect to 100 parts by weight of the carboxy-modified polymer contained in the latex. Adjusting the content of the xanthogen compound within the aforementioned ranges can result in a molded film, such as a dip-molded product, which can avoid delayed (Type IV) allergic reactions and has further improved tear strength and tensile strength.

In the present invention, the latex composition is preferably substantially free from compounds conventionally used as vulcanization accelerators other than the xanthogen compound, specifically, vulcanization accelerators containing sulfur which may cause delayed (Type IV) allergic reactions (such as dithiocarbamate vulcanization accelerators and thiazole vulcanization accelerators) and remain in a molded film, such as a dip-molded product, after they act as vulcanization accelerators.

In the latex composition according to the present invention, the xanthogen compound can be mixed by any method that eventually allows the carboxy-modified polymer latex to be mixed with the xanthogen compound. Examples thereof include a method of obtaining the aforementioned carboxy-modified polymer latex and thereafter mixing the xanthogen compound with the carboxy-modified polymer latex, a method of preliminarily mixing the xanthogen compound with a solution or microsuspension of the carboxy-modified polymer dissolved or finely dispersed in an organic solvent, thereafter emulsifying the solution or fine suspension of the carboxy-modified polymer mixed with the xanthogen compound in water, and removing the organic solvent as required to obtain a latex of the carboxy-modified polymer mixed with the xanthogen compound, and the like. Among these, a method of obtaining the carboxy-modified polymer latex and thereafter mixing the xanthogen compound with the carboxy-modified polymer latex is preferable since the xanthogen compound is easily dissolved and is mixed more easily.

Typical Metal Compound

In addition to the carboxy-modified polymer latex and the xanthogen compound described above, the latex composition according to the present invention contains a typical metal compound in a form other than an oxide.

According to the present invention, the typical metal compound contained in the latex composition acts as a vulcanization accelerator together with the aforementioned xanthogen compound when a molded film, such as a dip-molded product, is foamed using the latex composition by vulcanizing the carboxy-modified polymer in the latex composition with the sulfur vulcanizing agent. Additionally, the typical metal compound itself acts as a cross-linking agent to cross-link carboxyl groups of the carboxy-modified polymer, thereby resulting in a molded film, such as a dip-molded product, having further improved tear strength and tensile strength.

The typical metal constituting the typical metal compound used in the present invention may be at least one element selected from the group consisting of the elements in Groups 1, 2, 12, 13, 14, 15, 16, 17, and 18. Among these, preferred are the elements in Groups 2, 12, 13, and 14, more preferred are zinc, magnesium, calcium, aluminum, and lead, further preferred are zinc, magnesium, and calcium, and particularly preferred is zinc.

The typical metal compound used in the present invention may be any compound that contains any of the aforementioned typical metals and is not an oxide. From the viewpoint of producing a molded film, such as a dip-molded body, having further improved tear strength and tensile strength, compounds having at least one carbon are preferable, carbonates, hydrogen carbonates, hydroxides, and organic metal compounds are more preferable, and carbonates, hydrogen carbonates, and organic metal compounds are further more preferable. Among these, inorganic salts such as carbonates and hydrogen carbonates are particularly preferable from the viewpoint of high stability and availability of the compounds. One of these typical metal compounds may be used alone, or two or more of these may be used in combination.

As described above, the typical metal compound used in the present invention may be any compound other than oxides. Examples of such oxides include zinc oxide, magnesium oxide, calcium oxide, lead oxide, tin oxide, aluminum oxide, and the like.

The content of the typical metal compound in the latex composition according to the present invention is preferably 0.01 to 10 parts by weight, more preferably 0.1 to 5 parts by weight, further more preferably 1 to 3 parts by weight with respect to 100 parts by weight of the carboxy-modified polymer contained in the latex. Adjusting the content of the typical metal compound within the aforementioned ranges can result in a molded film, such as a dip-molded product, having further improved tear strength and tensile strength.

In the latex composition according to the present invention, the typical metal compound can be mixed by any method that eventually allows the carboxy-modified polymer latex to be mixed with the typical metal compound. Examples thereof include a method of obtaining the carboxy-modified polymer latex and thereafter mixing the typical metal compound with the carboxy-modified polymer latex, and the like.

Latex Composition

The latex composition according to the present invention contains a carboxy-modified polymer latex, a xanthogen compound, and a typical metal compound as described above.

Although the latex composition according to the present invention suffices to contain a carboxy-modified polymer latex, a xanthogen compound, and a typical metal compound, it is preferable that the latex composition further contain a sulfur vulcanizing agent.

Examples of the sulfur vulcanizing agent include sulfur such as powder sulfur, flowers of sulfur, precipitated sulfur, colloid sulfur, surface-treated sulfur, and insoluble sulfur; sulfur-containing compounds such as sulfur chloride, sulfur dichloride, morpholine disulfide, alkyl phenol disulfides, caprolactam disulfide (N,N'-dithio-bis(hexahydro-2H-azepinone-2)), phosphorus-containing polysulfides, polymer polysulfides, and 2-(4'-moipholinodithio)benzothiazole; and the like. Among these, sulfur can be preferably used. One of the cross-linking agents may be used alone, or two or more of them may be used in combination.

Although the content of the sulfur vulcanizing agent is not specifically limited, the content is preferably 0.1 to 10 parts by weight, more preferably 0.2 to 3 parts by weight with respect to 100 parts by weight of the carboxy-modified polymer. Adjusting the content of the sulfur vulcanizing agent within the aforementioned ranges can result in a molded film, such as a dip-molded product, which can avoid delayed (Type IV) allergic reactions and has further enhanced tear strength and tensile strength.

Further, the latex composition according to the present invention may further contain a cross-linking accelerator as long as the latex composition can provide a molded film, such as a dip-molded product, which can avoid the development of delayed (Type IV) allergic reactions.

As the cross-linking accelerator, any cross-linking accelerators that are generally used in dip-molding can be used, and examples thereof include dithiocarbamic acids, such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, diethylthiocarbaylthio)benzothiazole, 2-(2,6-dimethyl-4-morpholinothio)benzothiazole, 2-(4'-morpholinodithio)benzothiazole, 4-morpholinyl-2-benzothiazyl disulfide, 1,3-bis(2-benzothiazylmercaptomethyl)urea, and the like. Zinc diethyldithiocarbamate, 2 zinc dibutyldithiocarbamate, and zinc 2-mercaptobenzothiazole are preferable. One of the cross-linking accelerators may be used alone, or two or more of them may be used in combination.

The latex composition according to the present invention can further contain optional compounding agents including antioxidants; dispersants; reinforcers such as carbon black, silica, and talc; fillers such as calcium carbonate and clay; ultraviolet absorbers; and plasticizers.

Examples of the antioxidants include phenolic antioxidants containing no sulfur atoms such as 2,6-di-4-methylphenol, 2,6-di-t-butylphenol, butylhydroxyanisole, 2,6-di-t-butyl-α-dimethylamino-p-cresol, octadecyl-3-(3,5-di-t-butyl-4-hydroxyphenyl)propionate, styrenated phenol, 2,2'-methylene-bis(6-α-methyl-benzyl-p-cresol), 4,4'-methylenebis(2,6-di-t-butylphenol), 2,2'-methylene-bis(4-methyl-6-t-butylphenol), alkylated bisphenols, and a butylated reaction product of p-cresol with dicyclopentadiene; thiobisphenol antioxidants such as 2,2'-thiobis-(4-methyl-6-t-butylphenol), 4,4'-thiobis-(6-t-butyl-o-cresol), and 2,6-di-t-butyl-4-(4,6-bis(octylthio)-1,3,5-triazin-2-ylamino)phenol; phosphite ester antioxidants such as tris(nonylphenyl) phosphite, diphenylisodecyl phosphite, and tetraphenyl dipropylene glycol diphosphite; sulfur ester antioxidants such as dilauryl thiodipropionate; amine antioxidants such as phenyl-α-naphthylamine, phenyl-β-naphthylamine, p-(p-toluenesulfonylamide)-diphenylamine, 4,4'-(α,α-dimethylbenzyl)diphenylamine, N,N-diphenyl-p-phenylenediamine, N-isopropyl-N'-phenyl-p-phenylenediamine, and butyl aldehyde-aniline condensate; quinoline antioxidants such as 6-ethoxy-2,2,4-trimethyl-1,2-dihydroquinoline; hydroquinone antioxidants such as 2,5-di-(t-amyl)hydroquinone; and the like. One of these antioxidants can be used alone, or two or more of them can be used in combination.

The content of the antioxidant is preferably 0.05 to 10 parts by weight, more preferably 0.1 to 5 parts by weight with respect to 100 parts by weight of the carboxy-modified polymer.

These compounding agents can be mixed in the latex composition according to the present invention by any method without limitation. Examples thereof include a method of obtaining a latex composition containing the carboxy-modified polymer latex, the xanthogen compound, and the typical metal compound as described above, and thereafter mixing the optional compounding agents in the latex composition using a disperser such as a ball mill, a kneader, or a disperser; a method of preparing an aqueous dispersion of ingredients other than the carboxy-modified polymer latex, and thereafter mixing the aqueous dispersion in the carboxy-modified polymer latex using the aforementioned disperser; and the like.

The solids content of the latex composition according to the present invention is preferably 10 to 60 wt %, more preferably 10 to 55 wt %.

In the case of containing a sulfur vulcanizing agent, the latex composition according to the present invention is preferably aged (pre-crosslinked) before dip-molding in order to produce a molded film, such as a dip-molded product, having further enhanced mechanical properties. Although the pre-crosslinking time is not specifically limited and depends also on the pre-crosslinking temperature, the pre-crosslinking time is preferably 1 to 14 days, more preferably 1 to 7 days. The pre-crosslinking temperature is preferably 20 to 40° C.

Then, after the pre-crosslinking, the latex composition is preferably stored at a temperature of 10 to 30° C. until the dip-molding. Storage at high temperature results in a molded film, such as a dip-molded product, having reduced tear strength and tensile strength in some cases.

Molded Film

The molded film according to the present invention is a molded product in the form of a film made of the latex composition according to the present invention. The film thickness of the molded film according to the present invention is preferably 0.03 to 0.50 mm, more preferably 0.05 to 0.40 mm, particularly preferably 0.08 to 0.30 mm.

The molded film according to the present invention, although not specifically limited, is suitably a dip-molded product obtained by dip-molding the latex composition according to the present invention. The dip-molding is a method involving immersing a mold in the latex composition to deposit the composition on the surface of the mold, then pulling the mold out of the composition, and thereafter drying the composition deposited on the surface of the mold. The mold before the immersion in the latex composition may be preheated. Further, before the mold is immersed in the latex composition or after the mold is pulled out of the latex composition, a coagulant can be used as required.

Specific examples of methods for using the coagulant include a method of attaching the coagulant to the mold by immersing the mold in a coagulant solution before the immersion in the latex composition (anode coagulant dipping), and a method of immersing a mold on which the latex composition has been deposited in a coagulant solution (Teague coagulant dipping), and the like. The anode coagulant dipping is preferable in that a dip-molded product having less unevenness in thickness is obtained.

Specific examples of the coagulant include water-soluble polyvalent metal salts including metal halides such as barium chloride, calcium chloride, magnesium chloride, zinc chloride, and aluminum chloride; nitrates such as barium nitrate, calcium nitrate, and zinc nitrate; acetates such as barium acetate, calcium acetate, and zinc acetate; and sulfates such as calcium sulfate, magnesium sulfate, and aluminum sulfate. Among these, calcium salts are preferable, and calcium nitrate is more preferable. One of these water-soluble polyvalent metal salts can be used alone, or two or more of them can be used in combination.

The coagulant can be generally used as a solution in water, an alcohol, or a mixture thereof, and is preferably used in the form of an aqueous solution. The aqueous solution may further contain a water-soluble organic solvent such as methanol or ethanol, and a nonionic surfactant. Although the concentration of the coagulant varies depending on the type of the water-soluble polyvalent metal salts, the concentration is preferably 5 to 50 wt %, more preferably 10 to 30 wt %.

The mold after pulled out of the latex composition is generally heated to dry the deposit foamed on the mold. The drying conditions may be appropriately selected.

In the case where the latex composition contains a cross-linking agent, the dip-molded layer obtained is generally subjected to heat treatment for cross-linking. Before the heat treatment, immersion in water, preferably hot water at 30 to 70° C. for about 1 to 60 minutes may be performed to remove water-soluble impurities (such as excess emulsifier and coagulant). Although the water-soluble impurities may be removed after the heat treatment of the dip-molded layer, those impurities are preferably removed before the heat treatment since those can be removed more efficiently.

The dip-molded layer is cross-linked by heat treatment generally at a temperature of 80 to 150° C., preferably for 10 to 130 minutes. As a heating method, external heating methods using infrared rays or heated air or internal heating methods using high-frequency waves can be employed. Among these, external heating using heated air is preferable.

Then, a dip-molded product is obtained as a molded film by detaching the dip-molded layer from the mold for dip-molding. As a detaching method, a method of peeling the film from the mold for forming by hand or a method of peeling the film by water pressure or pressure of compressed air can be employed. After the detachment, heat treatment at a temperature of 60 to 120° C. for 10 to 120 minutes may be further performed.

Besides dip-molding of the latex composition according to the present invention, the molded film according to the present invention may be obtained by any method (such as coating method) which enables formation of the latex composition according to the present invention into a film.

The molded film according to the present invention including a dip-molded product according to the present invention is obtained using the latex composition according to the present invention, and therefore can avoid delayed (Type IV) allergic reactions and has excellent tear strength and tensile strength. For this reason, the molded film according to the present invention can be used particularly suitably as a glove, for example. In the case where the molded film forms a glove, inorganic fine particles made of talc, calcium carbonate, or the like or organic fine particles such as starch particles may be spread on the surface of the glove, an elastomer layer containing fine particles may be famed on the surface of the glove, or the surface layer of the glove may be chlorinated in order to prevent the adhesion of contacting parts of the molded film and allow the glove to be put on and taken off more smoothly.

Further, other than the aforementioned glove, the molded film according to the present invention including a dip-molded product according to the present invention can be used as medical supplies such as baby bottle nipples, droppers, tubes, water pillows, balloon stalls, catheters, and condoms; toys such as balloons, dolls, and balls; industrial supplies such as pressure molding bags and gas storage bags; fingerstalls; and the like.

Adhesive Composition

In the present invention, the latex composition according to the present invention can be used as an adhesive composition.

The content (solids content) of the latex composition in the adhesive composition is preferably 5 to 60 wt %, more preferably 10 to 30 wt %.

The adhesive composition preferably contains an adhesive resin in addition to the latex composition according to the present invention. Although the adhesive resin is not specifically limited, a resorcinol-formaldehyde resin, a melamine resin, an epoxy resin, and an isocyanate resin can be suitably used, for example. Among these, a resorcinol-formaldehyde resin is preferable. A known resorcinol-formaldehyde resin (such as those disclosed in Japanese Patent Application Laid-Open No. 55-142635) can be used. The reaction ratio of resorcinol to formaldehyde is generally 1:1 to 1:5, preferably 1:1 to 1:3 in terms of the molar ratio of "resorcinol:formaldehyde".

For further enhancing the adhesion of the adhesive composition, the adhesive composition can contain 2,6-bis(2,4-dihydroxyphenylmethyl)-4-chlorophenol or a similar compound, an isocyanate, a blocked isocyanate, ethylene urea, polyepoxide, modified polyvinyl chloride resin, and the like, which are conventionally used.

Further, the adhesive composition can contain a vulcanization aid. Containing a vulcanization aid can improve the mechanical strength of the later-described composite to be obtained using the adhesive composition. Examples of the vulcanization aid can include quinone dioximes such as p-quinone dioxime; methacrylic acid esters such as lauryl methacrylate and methyl methacrylate; allyl compounds such as DAF (diallyl fumarate), DAP (diallyl phthalate), TAC (triallyl cyanurate), and TRIC (triallyl isocyanurate); maleimide compounds such as bismaleimide, phenylmaleimide, and N,N-m-phenylenedimaleimide; sulfur; and the like.

Substrate with Adhesive Layer

The substrate with an adhesive layer according to the present invention is obtained by forming an adhesive layer using the latex composition or the adhesive composition according to the present invention on a surface of a substrate.

Although the substrate is not specifically limited, a fiber substrate can be used, for example. The type of fibers constituting the fiber substrate is not specifically limited, and examples thereof include vinylon fibers, polyester fibers, polyamide fibers such as nylon and aramid (aromatic polyamide) fibers, glass fibers, cotton, rayon, and the like. These can be appropriately selected according to the application. The shape of the fiber substrate is not specifically limited, and examples thereof can include shapes of staples, filaments, cords, ropes, woven fabrics (such as canvas), and the like, which can be appropriately selected according to the application. For example, the substrate with an adhesive layer can be used as a substrate-rubber composite by adhering to a rubber via the adhesive layer. Although the substrate-rubber composite is not specifically limited, examples thereof include a toothed rubber belt with a core using a fiber substrate in the form of a cord, a toothed rubber belt using a fiber substrate in the form of a base fabric such as a canvas, and the like.

Although any method for obtaining the substrate-rubber composite can be used without limitation, examples thereof include a method of applying the adhesive composition to the substrate, for example, by immersion and the like to obtain the substrate with an adhesive layer and placing the substrate with an adhesive layer on a rubber, followed by heating and pressurization. The pressurization can be performed using a compression (press) molding machine, a metal roll, an injection molding machine, or the like. The pressure for the pressurization is preferably 0.5 to 20 MPa, more preferably 2 to 10 MPa. The heating temperature is preferably 130 to 300° C., more preferably 150 to 250° C. The heating and pressurization time is preferably 1 to 180 minutes, more preferably 5 to 120 minutes. The heating and pressurization method enables the molding of the rubber and the adhesion between the substrate with an adhesive layer and the rubber to be performed simultaneously. A mold for imparting a desired surface shape to the rubber of the substrate-rubber composite is preferably famed on the inner surface of the mold of the compressor or the surface of the roll used for the pressurization.

Further, one aspect of the substrate-rubber composite can include a substrate-rubber-substrate composite. The substrate-rubber-substrate composite can be famed, for example, by combining a substrate (which may be a composite of two or more substrates) with the substrate-rubber composite. Specifically, a core serving as a substrate, a rubber, and a base fabric serving as a substrate are layered (at this time, the adhesive composition has been appropriately applied to the core and the base fabric to foam substrates with an adhesive layer), followed by pressurization under heating, so that a substrate-rubber-substrate composite can be obtained.

The substrate-rubber composite obtained using the substrate with an adhesive layer according to the present invention is excellent in mechanical strength, abrasion resistance, and water resistance, and therefore can be suitably used as a belt such as a flat belt, a V belt, a V-ribbed belt, a round belt, a square belt, and a toothed belt. Further, the substrate-rubber composite obtained using the substrate with an adhesive layer according to the present invention is excellent in oil resistance, and can be suitably used as an in-oil belt. Further, the substrate-rubber composite obtained using the substrate with an adhesive layer according to the present invention can also be suitably used for hoses, tubes, diaphragms, and the like. Examples of the hoses include single-tube rubber hoses, multilayer rubber hoses, braided reinforced hoses, fabric-wrapped reinforced hoses, and the like. Examples of the diaphragms include flat diaphragms, rolling diaphragms, and the like.

The substrate-rubber composite obtained using the substrate with an adhesive layer according to the present invention can also be used as industrial products such as seals and rubber rolls in addition to the aforementioned applications. Examples of the seals include seals for moving parts such as rotating, swinging, and reciprocating parts and seals for fixed parts. Examples of the seals for moving parts include oil seals, piston seals, mechanical seals, boots, dust covers, diaphragms, accumulators, and the like. Examples of the seals for fixed parts include o-rings, various gaskets, and the like. Examples of the rubber rolls include rolls that are parts of OA equipment such as printers and copiers; fiber processing rolls such as stretching rolls for spinning and draft rolls for spinning; steel rolls such as bridle rolls, snubber rolls, and steering rolls; and the like. Additionally, the substrate-rubber composite obtained using the substrate with an adhesive layer according to the present invention can be used to package an object such as an adhesive bandage. The package structure for packaging such an object can be produced, for example, by a method for producing a packaging structure, the method comprising an application step of applying the latex composition according to the present invention to at least one of surfaces of a first sheet substrate and/or a second sheet substrate; a lamination step of sandwiching the object between the first sheet substrate and the second sheet substrate in such a manner that at least part of the latex-coated surface of the first substrate and at least part of the latex-coated surface of the second sheet substrate are in direct contact with each other, thereby providing a laminate; a pressing step of pressing at least a portion of the laminate where the first sheet substrate and the second sheet substrate are in direct contact with each other, thereby providing a pressed laminate; and a sterilization step of subjecting the pressed laminate to sterilization treatment.

EXAMPLES

Hereinafter, the present invention will be specifically described with reference to the Examples. However, the present invention is not limited to these examples. The "part(s)" below is based on weight unless otherwise specified. Various physical properties were measured as follows.

Solids Content 2 g of each sample was accurately weighed (weight: X2) into an aluminum dish (weight: X1), followed by drying in a hot air dryer at 105° C. for 2 hours. Subsequently, after cooling in a desiccator, the weight thereof including the aluminum dish was measured (weight: X3) to calculate the solids content according to the following calculation formula.

Solids content (wt %)=($X3-X1$)×100/$X2$

Degree of Modification

The number of carboxyl groups in the carboxy-modified polymer constituting the carboxy-modified polymer latex was determined by measuring the carboxy-modified polymer by $^1$H-NMR. Then, the degree of modification with a compound having a carboxyl group was determined using formula (i) below based on the determined number of carboxyl groups.

Degree of modification (mol %)=($X/Y$)×100     (i)

In formula (i), X represents the number of carboxyl groups in the carboxy-modified polymer, and Y represents the total number of monomer units of the carboxy-modified polymer ((weight average molecular weight (Mw) of carboxy-modified polymer)/(average molecular weight of monomers based on contents of respective monomer units constituting carboxy-modified polymer (average molecular weight of monomer mixture))).

Content of Aggregates

After the latex composition was allowed to stand still at 30° C. for 2 days, the solids content of the latex composition was measured according to the aforementioned method. 100 g of the latex composition was accurately weighed, and was thereafter filtered with a 200-mesh SUS wire screen of known weight. Then, aggregates on the wire screen were washed with water several times to remove the latex composition. The aggregates were dried at 105° C. for 2 hours or more, and thereafter the dry weight was measured to determine the content of aggregates (unit: wt %) based on the formula below:

Content of aggregates (wt %)={($\alpha-\beta$)/($\gamma\times\Delta$)}×10,000

Here, $\alpha$ represents the weight of the wire screen after drying and the dry aggregates, $\beta$ represents the weight of the wire screen, $\gamma$ represents the weight of the latex composition, and $\Delta$ represents the solids content of the latex composition.

Tear Strength of Dip-Molded Product

In accordance with ASTM D624-00, a dip-molded product was allowed to stand still in a constant-temperature and constant-humidity room at 23° C. and a relative humidity of 50% for 24 hours or more, and then was punched out using a dumbbell (product name "Die C", manufactured by DUMBBELL CO., LTD.) to prepare a test piece for tear strength measurement. The test piece was stretched at a stretching speed of 500 mm/min using a TENSILON Universal Material Testing Instrument (product name "RTG-1210", available from A&D Company, Limited) to measure the tear strength (unit: N/mm).

Tensile Strength of Dip-Molded Product

In accordance with ASTM D412, a dip-molded product was punched out using a dumbbell (product name "SUPER DUMBBELL (type: SDMK-100C)" manufactured by DUMBBELL CO., LTD.) to produce a test piece for tensile strength measurement. The test specimens were stretched at a stretching speed of 500 mm/min using a TENSILON Universal Material Testing Instrument (product name "RTG-1210", available from ORIENTEC CORPORATION) to measure the tensile strength immediately before break (unit: MPa).

Preparation Example 1

Production of Carboxy-Modified Synthetic Polyisoprene (A-1) Latex

Synthetic polyisoprene (product name "NIPOL IR2200L", available from Zeon Corporation, isoprene homopolymer, the amount of cis-bond units: 98 wt %) with a weight average molecular weight of 1,300,000 was mixed with cyclohexane, and was dissolved therein by raising the temperature to 60° C. under stirring to prepare a cyclohexane solution (a) of the synthetic polyisoprene (solids content: 8 wt %) with a viscosity of 12,000 mPa·s, which was measured using a type B viscometer.

Meanwhile, 20 parts of sodium rosinate was added to water, and was dissolved therein by raising the temperature to 60° C. to prepare an anionic surfactant aqueous solution (b) with a concentration of 1.5 wt %.

Next, the cyclohexane solution (a) and the anionic surfactant aqueous solution (b) were mixed at a weight ratio of 1:1.5 using a mixer (product name "Multi Line mixer MS26-MMR-5.5L", available from SATAKE CHEMICAL EQUIPMENT MFG., LTD.), and then were mixed and emulsified at a rotational speed of 4100 rpm using an emulsifying apparatus (product name "MILDER MDN310", available from Pacific Machinery & Engineering Co., Ltd.), to obtain an emulsified liquid (c). At that time, the total feed flow rate of the cyclohexane solution (a) and the anionic surfactant aqueous solution (b) was 2,000 kg/hr, the temperature was 60° C., and the back pressure (gauge pressure) was 0.5 MPa.

Subsequently, the emulsified liquid (c) was heated to 80° C. under reduced pressure of −0.01 to −0.09 MPa (gauge pressure), thereby distilling off cyclohexane. An aqueous dispersion (d) of the synthetic polyisoprene was obtained. At that time, a defoamer (product name "SM5515", available from Dow Corning Toray Co., Ltd.) was continuously added by spraying the defoamer in an amount of 300 ppm by weight with respect to the synthetic polyisoprene in the emulsified liquid (c). When cyclohexane was distilled off, the emulsified liquid (c) was adjusted to 70 vol % or less of the tank volume, and stirring was gradually conducted at 60 rpm using a three-bladed inclined paddle as a stirring blade.

After the completion of distilling off of cyclohexane, the aqueous dispersion (d) of the synthetic polyisoprene obtained was centrifuged at 4,000 to 5,000 G using a continuous centrifuge (product name "SRG510", available from Alfa Laval AB) to obtain a synthetic polyisoprene latex (e) with a solids content of 56 wt % as a light liquid. The conditions for centrifugation were as follows: the solids content of the aqueous dispersion (d) before centrifugation was 10 wt %; the flow rate during continuous centrifugation was 1300 kg/hr; and the back pressure (gauge pressure) of the centrifuge was 1.5 MPa. The synthetic polyisoprene latex (e) obtained had a solids content of 60 wt %.

Subsequently, 130 parts of distilled water for dilution was added with respect to 100 parts of the synthetic polyisoprene in the resulting synthetic polyisoprene latex (e) to dilute the latex. A solution of 0.8 parts (with respect to 100 parts of the synthetic polyisoprene) of the sodium salt of β-naphthalene sulfonic acid formaldehyde condensate (product name "DEMOL T-45", manufactured by Kao Corporation) as a dispersant diluted with 4 parts (with respect to 100 parts of the synthetic polyisoprene) of distilled water was added to the synthetic polyisoprene latex (e) over 5 minutes. Next, the synthetic polyisoprene latex (e) containing the dispersant was placed in a nitrogen-purged reactor provided with a stirrer, and was warmed to 30° C. while being stirred. In another reactor, a diluted solution of methacrylic acid was prepared by mixing 5 parts of methacrylic acid as a carboxyl group-containing compound and 16 parts of distilled water. The diluted solution of methacrylic acid was added to the reactor heated to 30° C. over 30 minutes.

Further, a solution (f) composed of 7 parts of distilled water, 0.32 parts of sodium formaldehyde sulfoxylate (product name "SFS", available from MITSUBISHI GAS CHEMICAL COMPANY, INC.), and 0.01 parts of ferrous sulfate (product name "Frost Fe", available from CHELEST CORPORATION) was prepared using another reactor. After the solution (f) was transferred to the polymerization reactor, 0.5 parts of 1,1,3,3-tetramethylbutyl hydroperoxide (product name "PEROCTA H", available from NOF CORPORATION) was added thereto to react at 30° C. for 1 hour, thereby yielding a carboxy-modified synthetic polyisoprene (A-1) latex. The carboxy-modified synthetic polyisoprene (A-1) was then concentrated in a centrifuge to provide a light liquid having a solids content of 55 wt %. The degree of modification of the resulting carboxy-modified synthetic polyisoprene (A-1) latex was measured in accordance with the method described above, and was found to be 1 mol %.

Preparation Example 2

Production of Carboxy-Modified Synthetic Polyisoprene (A-2) Latex

A carboxy-modified synthetic polyisoprene (A-2) latex having a solids content of 56% was obtained in the same manner as in Preparation Example 1 except that the amount of methacrylic acid used was changed from 5 parts to 3 parts. The degree of modification of the resulting carboxy-modified synthetic polyisoprene (A-2) latex was measured in accordance with the method described above, and was found to be 0.5 mol %

Preparation Example 3

Production of Synthetic Polyisoprene (A'-3) Latex

A synthetic polyisoprene latex (e) was prepared in the same manner as in Preparation Example 1. This latex was named (A'-3) latex.

Example 1

Preparation of Latex Composition

First, 100% of carboxyl groups in a styrene-maleic acid mono-sec-butyl ester-maleic acid monomethyl ester polymer (product name "Scripset 550", available from Hercules Inc.) were neutralized with sodium hydroxide, to prepare a sodium salt aqueous solution (with a concentration of 10 wt %). Then, the sodium salt aqueous solution was added to the carboxy-modified synthetic polyisoprene (A-1) latex obtained in Preparation Example 1 in an amount of 0.8 parts in terms of solids content with respect to 100 parts of the carboxy-modified synthetic polyisoprene (A-1). A mixture was thus obtained.

Then, 2 parts of zinc diisopropyl xanthate as a xanthogen compound was added with respect to 100 parts of the carboxy-modified synthetic polyisoprene (A-1) in the resulting mixture while the mixture was being stirred.

Subsequently, aqueous dispersions of compounding agents were added in amounts containing 1.5 parts of zinc oxide as a metal oxide, 1.5 parts of sulfur, and 2 parts of an antioxidant agent (product name "Wingstay L", available from Goodyear Tire and Rubber Company) in terms of solids content to obtain a latex composition. Then, a portion of the prepared latex composition was measured to determine the content of aggregates therein according to the aforementioned method. Table 1 shows the results. The amount of dispersant added shown in Table 1 is based on 100 parts of the synthetic polyisoprene before carboxy-modification. Meanwhile, the remaining latex composition for which the content of aggregates was not measured was aged in a constant-temperature water bath adjusted to 30° C. for 48 hours.

Production of Dip-Molded Product

A commercially available ceramic hand mold (manufactured by SHINKO CERAMICS CO., LTD.) was washed, followed by preheating in an oven at 70° C. Thereafter, the hand mold was immersed in a coagulant aqueous solution containing 18 wt % of calcium nitrate and 0.05 wt % of polyoxyethylene lauryl ether (product name "EMULGEN 109P", manufactured by Kao Corporation) for 5 seconds, and was taken out of the coagulant aqueous solution. Subsequently, the hand mold was dried in an oven at 70° C. for 30 minutes or more, thereby allowing the coagulant to adhere to the hand mold, so that the hand mold was coated with the coagulant.

Thereafter, the hand mold coated with the coagulant was taken out of the oven, and was immersed for 10 seconds in the latex composition after aging. Subsequently, the hand mold was air-dried at room temperature for 10 minutes, and was immersed in hot water at 60° C. for 5 minutes to elute water-soluble impurities, thereby forming a dip-molded layer on the hand mold. Thereafter, the dip-molded layer famed on the hand mold was cross-linked by heating in an oven under the conditions of a temperature of 130° C. for 30 minutes, followed by cooling to room temperature, and was separated from the hand mold after spreading talc to obtain a dip-molded product (rubber glove). Then, the resulting dip-molded product (rubber glove) was evaluated for tear strength and tensile strength according to the aforementioned methods. Table 1 shows the results.

Example 2

A latex composition and a dip-molded product (rubber glove) were produced in the same manner as in Example 1 except that 1.5 parts of zinc acetylacetonate was used instead of 1.5 parts of zinc carbonate, and were evaluated in the same manner as above. Table 1 shows the results.

Example 3

A latex composition and a dip-molded product (rubber glove) were produced in the same manner as in Example 2 except that the carboxy-modified synthetic polyisoprene (A-2) latex obtained in Preparation Example 2 (100 parts in terms of the carboxy-modified synthetic polyisoprene (A-2)) was used in the preparation of the latex composition instead of the carboxy-modified synthetic polyisoprene (A-1) latex obtained in Preparation Example 1, and were evaluated in the same manner. Table 1 shows the results.

Comparative Example 1

A latex composition and a dip-molded product (rubber glove) were produced in the same manner as in Example 3 except that 1.5 parts of zinc oxide was used in the preparation of the latex composition instead of 1.5 parts of zinc acetylacetonate, and were evaluated in the same manner as above. Table 1 shows the results.

Comparative Example 2

A latex composition and a dip-molded product (rubber glove) were produced in the same manner as in Example 3 except that the synthetic isoprene (A'-3) latex obtained in Preparation Example 3 (100 parts in terms of synthetic isoprene (A'-3)) was used instead of the carboxy-modified synthetic polyisoprene (A-2) latex obtained in Preparation Example 2, and were evaluated in the same manner as above. Table 1 shows the results.

TABLE 1

|  |  | Example | | | Comparative Example | |
| --- | --- | --- | --- | --- | --- | --- |
|  |  | 1 | 2 | 3 | 1 | 2 |
| Composition | | | | | | |
| Carboxy-modified synthetic polyisoprene (A-1) (degree of modification: 1 mol %) | (Parts) | 100 | 100 | | | |
| Carboxy-modified synthetic polyisoprene (A-2) (degree of modification: 0.5 mol %) | (Parts) | | | 100 | 100 | |
| Synthetic polyisoprene (A'-3) | (Parts) | | | | | 100 |
| Zinc diisopropyl xanthate | (Parts) | 2 | 2 | 2 | 2 | 2 |
| Zinc carbonate | (Parts) | 1.5 | | | | |
| Zinc acetylacetonate | (Parts) | | 1.5 | 1.5 | | 1.5 |
| Zinc oxide | (Parts) | | | | 1.5 | |
| Sulfur | (Parts) | 1.5 | 1.5 | 1.5 | 1.5 | 1.5 |
| Dispersant | (Parts) | 0.8 | 0.8 | 0.8 | 0.8 | 0.8 |
| Evaluation | | | | | | |
| Content of aggregates in latex composition | (wt %) | 0.00 | 0.00 | 0.01 | 0.02 | 0.71 |
| Tear strength of dip-molded product | (N/mm) | 45 | 41 | 35 | 29 | 9 |
| Tensile strength of dip-molded product | (MPa) | 23 | 23 | 21 | 19 | 7 |

From Table 1, the latex compositions containing a carboxy-modified polymer latex, a xanthogen compound, and a typical metal compound in a form other than an oxide had excellent stability since the occurrence of aggregates was suppressed. Additionally, the dip-molded products produced using the latex compositions had excellent tear strength and tensile strength (Examples 1 to 3).

In contrast, the latex composition containing a carboxy-modified polymer latex, a xanthogen compound, and a metal oxide had poor stability compared to those of Examples 1 to 3 because of increased aggregates. The dip-molded product produced using the latex composition had poor tear strength and tensile strength (Comparative Example 1).

Additionally, the latex composition obtained using a non-carboxy-modified synthetic polyisoprene latex instead of the carboxy-modified polymer latex generated a large amount of aggregates, and therefore had poor stability. Further, the dip-molded product produced using the latex composition had poor tear strength and tensile strength (Comparative Example 2).

The invention claimed is:

1. A latex composition comprising:
   a carboxy-modified synthetic polyisoprene latex;
   a zinc diisopropyl xanthate; and
   a typical metal compound in a form other than an oxide, wherein
   the carboxy-modified synthetic polyisoprene latex is comprised of a carboxy-modified synthetic polyisoprene obtained by modifying a synthetic polyisoprene with a monomer having a carboxyl group selected from the group consisting of acrylic acid and methacrylic acid, and a content of isoprene units in the synthetic polyisoprene is 95 wt % or more with respect to the total monomer units of the synthetic polyisoprene,
   a typical metal constituting the typical metal compound is zinc, magnesium, calcium, aluminum, or lead,
   a content of the zinc diisopropyl xanthate is 0.01 to 10 parts by weight with respect to 100 parts by weight of the carboxy-modified synthetic polyisoprene contained in the carboxy-modified synthetic polyisoprene latex, and
   the latex composition is free from dithiocarbamate vulcanization accelerators and thiazole vulcanization accelerators.

2. The latex composition according to claim 1, wherein the typical metal compound is a carbonate, a hydrogen carbonate, a hydroxide, or an organic metal compound containing a typical metal.

3. The latex composition according to claim 1, further comprising a dispersant.

4. The latex composition according to claim 1, further comprising a sulfur vulcanizing agent.

5. The latex composition according to claim 1, wherein the carboxy-modified synthetic polyisoprene has a degree of modification with carboxyl groups of 0.5 to 5 mol % as calculated based on the formula: (number of carboxyl groups/total number of monomer units of carboxy-modified synthetic polyisoprene)×100.

6. The latex composition according to claim 1, wherein the content of the zinc diisopropyl xanthate is 0.5 to 5 parts by weight, with respect to 100 parts by weight of the carboxy-modified synthetic polyisoprene contained in the carboxy-modified synthetic polyisoprene latex.

7. The latex composition according to claim 1, wherein the carboxy-modified synthetic polyisoprene has a degree of modification with carboxyl groups of 0.5 to 5 mol % as calculated based on the formula: (number of carboxyl groups/total number of monomer units of carboxy-modified synthetic polyisoprene)×100, and
   the content of the zinc diisopropyl xanthate is 0.5 to 5 parts by weight, with respect to 100 parts by weight of the carboxy-modified synthetic polyisoprene contained in the carboxy-modified synthetic polyisoprene latex.

8. A method for producing a molded film comprising molding the latex composition according to claim 1 into a film.

9. A method for producing a substrate with an adhesive layer, the method comprising:
   forming the adhesive layer comprising the latex composition according to claim 1 on a surface of the substrate.

* * * * *